United States Patent [19]

McIntosh

[11] Patent Number: 4,651,414

[45] Date of Patent: * Mar. 24, 1987

[54] METHOD OF MAKING PROTECTIVE SHIELD FOR EXTERNAL ELECTRICAL PARTS OF A CONTROL ARRANGEMENT

[75] Inventor: Harold A. McIntosh, Crestline, Calif.

[73] Assignee: Robertshaw Controls Company, Richmond, Va.

[ * ] Notice: The portion of the term of this patent subsequent to Nov. 19, 2002 has been disclaimed.

[21] Appl. No.: 771,103

[22] Filed: Aug. 30, 1985

Related U.S. Application Data

[62] Division of Ser. No. 627,047, Jul. 2, 1984, Pat. No. 4,554,616.

[51] Int. Cl.$^4$ ............................................. H01R 43/00
[52] U.S. Cl. ........................................ 29/825; 174/66; 220/339
[58] Field of Search .................. 29/825; 174/5 R, 66, 174/67, 138 F; 339/44 R, 44 M; 220/339; 16/DIG. 13

[56] References Cited

U.S. PATENT DOCUMENTS

| | | | |
|---|---|---|---|
| 3,170,029 | 2/1965 | Stewart | 220/339 X |
| 3,477,224 | 11/1969 | Siefert | 220/339 X |
| 3,621,197 | 11/1971 | Place | 174/5 R X |
| 3,747,745 | 7/1973 | Esashi et al. | 220/339 X |
| 3,914,660 | 10/1975 | Stearley | 361/419 |
| 3,914,661 | 10/1975 | Manecke et al. | 174/66 X |

Primary Examiner—Howard N. Goldberg
Assistant Examiner—Carl J. Arbes
Attorney, Agent, or Firm—Candor, Candor & Tassone

[57] ABSTRACT

A combination of a control arrangement and a protective shield, the protective shield and methods of making the same are provided, the combination comprising a control arrangement having a housing unit provided with certain external electrical parts and a one-piece protective shield carried by the housing unit and having a section thereof covering the certain external electrical parts. The section of the protective shield is movable relative to the remainder of the shield between a first position thereof that covers the certain external electrical parts and a second position thereof that uncovers the certain external electrical parts.

8 Claims, 8 Drawing Figures

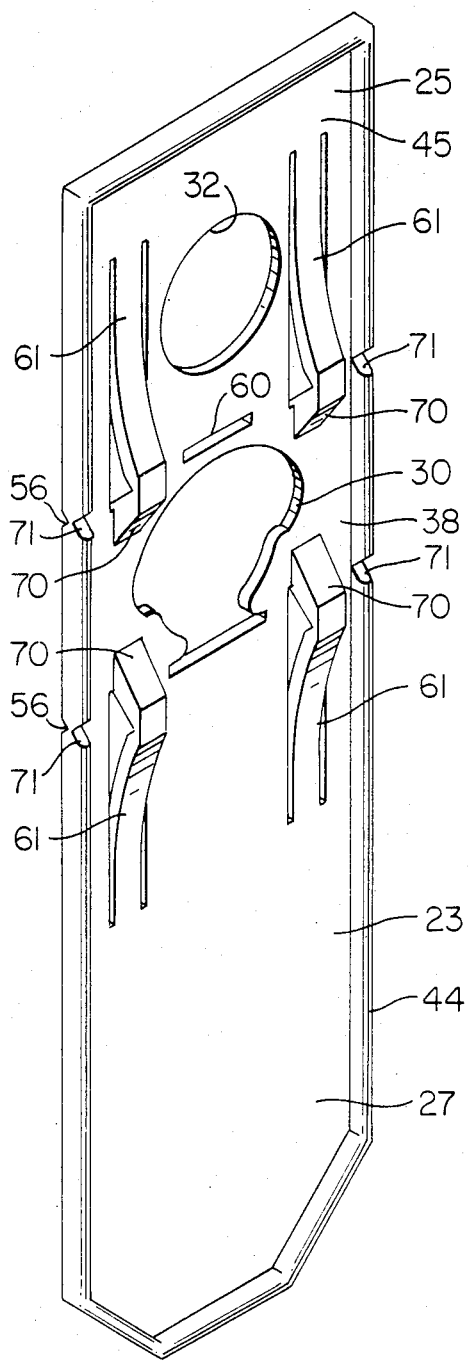
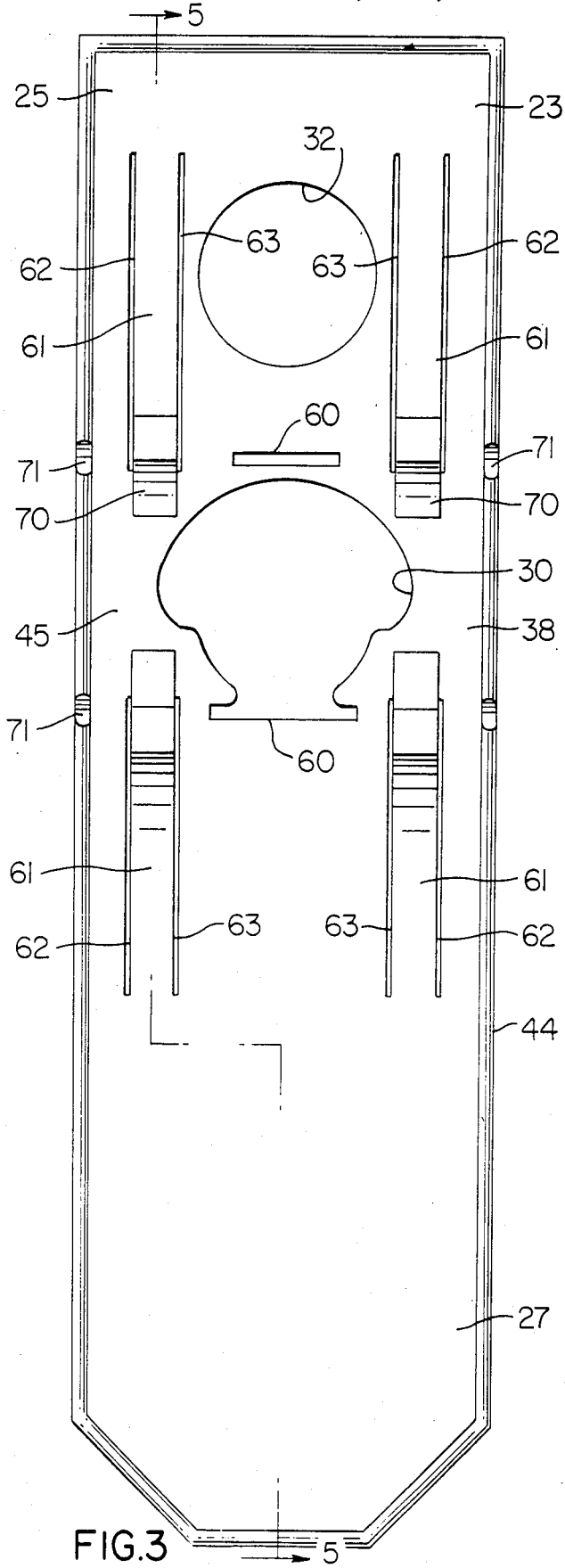
FIG.2
FIG.3

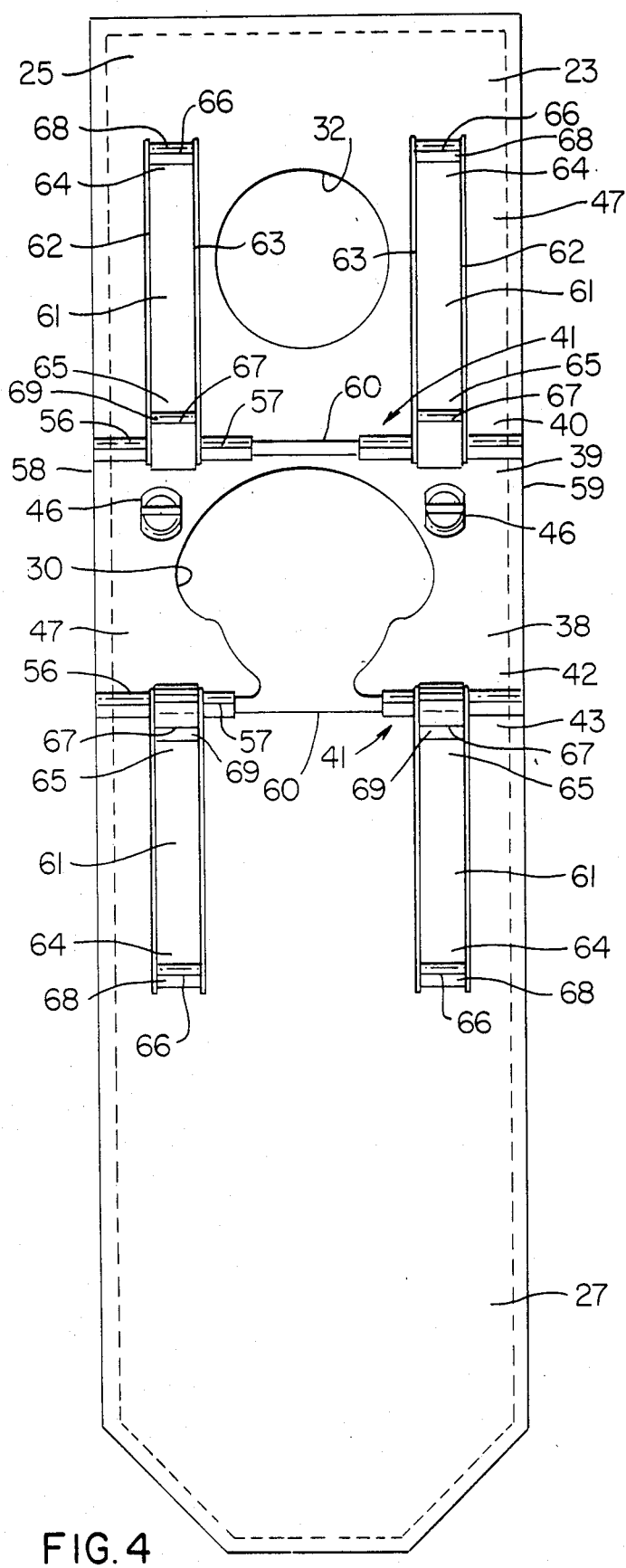
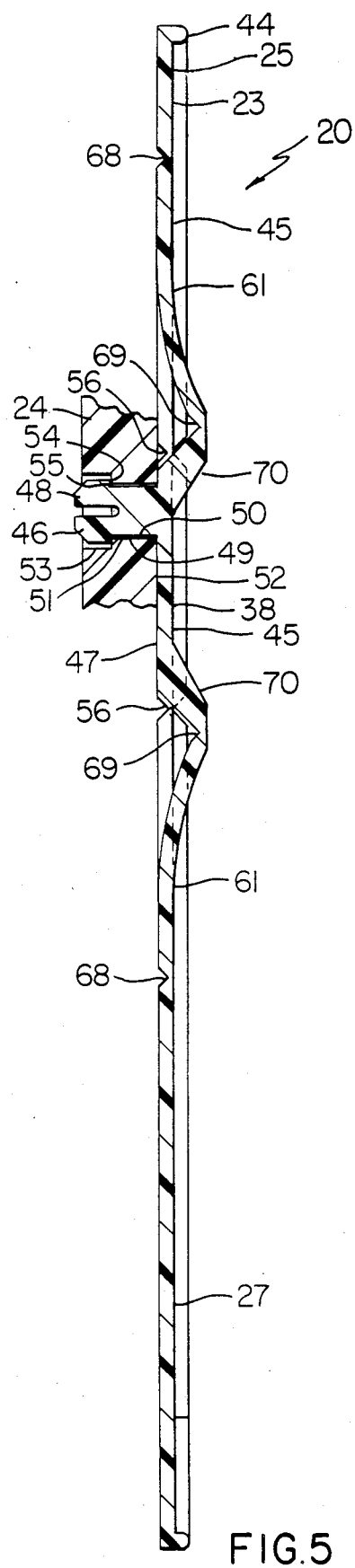
FIG.4
FIG.5

METHOD OF MAKING PROTECTIVE SHIELD FOR EXTERNAL ELECTRICAL PARTS OF A CONTROL ARRANGEMENT

CROSS REFERENCE TO RELATED APPLICATION

This application is a divisional patent application of its copending parent patent application, Ser. No. 627,047, filed July 2, 1984, now U.S. Pat. No. 4,554,616.

BACKGROUND OF THE INVENTION

1. Field of the Invention

This invention relates to a new protective shield for the external electrical means of a control arrangement and to a method of making such protective shield as well as to a combination of a control arrangement and such protective shield and to a method of making such a combination.

2. Prior Art Statement

It is known to provide a combination of a control arrangement having housing means provided with certain external electrical means and a one-piece protective shield carried by the housing means and having a section thereof covering the certain external electrical means. For example, see the Place, U.S. Pat. No. 3,621,197; the Them et al, U.S. Pat. No. 3,626,151; the Stearley, U.S. Pat. No. 3,914,660 and the Manecke et al, U.S. Pat. No. 3,914,661.

SUMMARY OF THE INVENTION

It is one feature of this invention to provide a new protective shield for covering certain external electrical means of the housing means of a control arrangement.

In particular, it was found according to the teachings of this invention that prior known protective shields must be completely removed from their respective control arrangements in order to provide access to the external electrical means of the control arrangement for servicing purposes and the like whereby the removed protective shield must be replaced on the control arrangement after access has been made to the external electrical means.

However, it was found according to the teachings of this invention that a one-piece protective shield can be provided with a movable section that can be moved between a position thereof that covers certain external electrical means of the control arrangement and a position thereof that uncovers the certain external electrical means for servicing purposes and the like so that the protective shield need not be removed from the control arrangement to provide access to those certain external electrical means thereof.

For example, one embodiment of this invention provides a combination of a control arrangement having housing means provided with certain external electrical means and a one-piece protective shield carried by the housing means and having a section thereof covering the certain external electrical means, the section of the protective shield being movable relative to the remainder of the shield between a first position thereof that covers the certain external electrical means and a second position thereof that uncovers the certain external electrical means.

The protective shield is substantially flat when the section is in the first position thereof, the section of the protective shield being substantially transverse to the remainder of the shield when the section is in the second position thereof. The protective shield has hinge means that hinge the section to the remainder of the protective shield, the hinge means having means that holds the section in the first position thereof when the section is moved to the first position thereof and that holds the section in the second position thereof when the section is moved to the second position thereof.

Accordingly, it is an object of this invention to provide a new combination of a control arrangement and a one-piece protective shield, the new combination of this invention having one or more of the novel features of this invention as set forth above or hereinafter shown or described.

Another object of this invention is to provide a method of making such a new combination, the method of this invention having one or more of the novel features of this invention as set forth above or hereinafter shown or described.

Another object of this invention is to provide a new protective shield for a control arrangement, the protective shield of this invention having one or more of the novel features of this invention as set forth above or hereinafter shown or described.

Another object of this invention is to provide a method of making such a protective shield, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 2 is an enlarged front perspective view of the protective shield of FIG. 1.

FIG. 3 is an enlarged front view of the protective shield of FIG. 1.

FIG. 4 is a view similar to FIG. 3 and illustrates the rear side of the protective shield of FIG. 1.

FIG. 5 is a cross-sectional view taken on line 5—5 of FIG. 3 and illustrates a fragmentary portion of the housing means of the control arrangement of FIG. 1 in order to illustrate how the protective shield is secured to the housing.

DESCRIPTION OF THE PREFERRED EMBODIMENT

Figure 1:
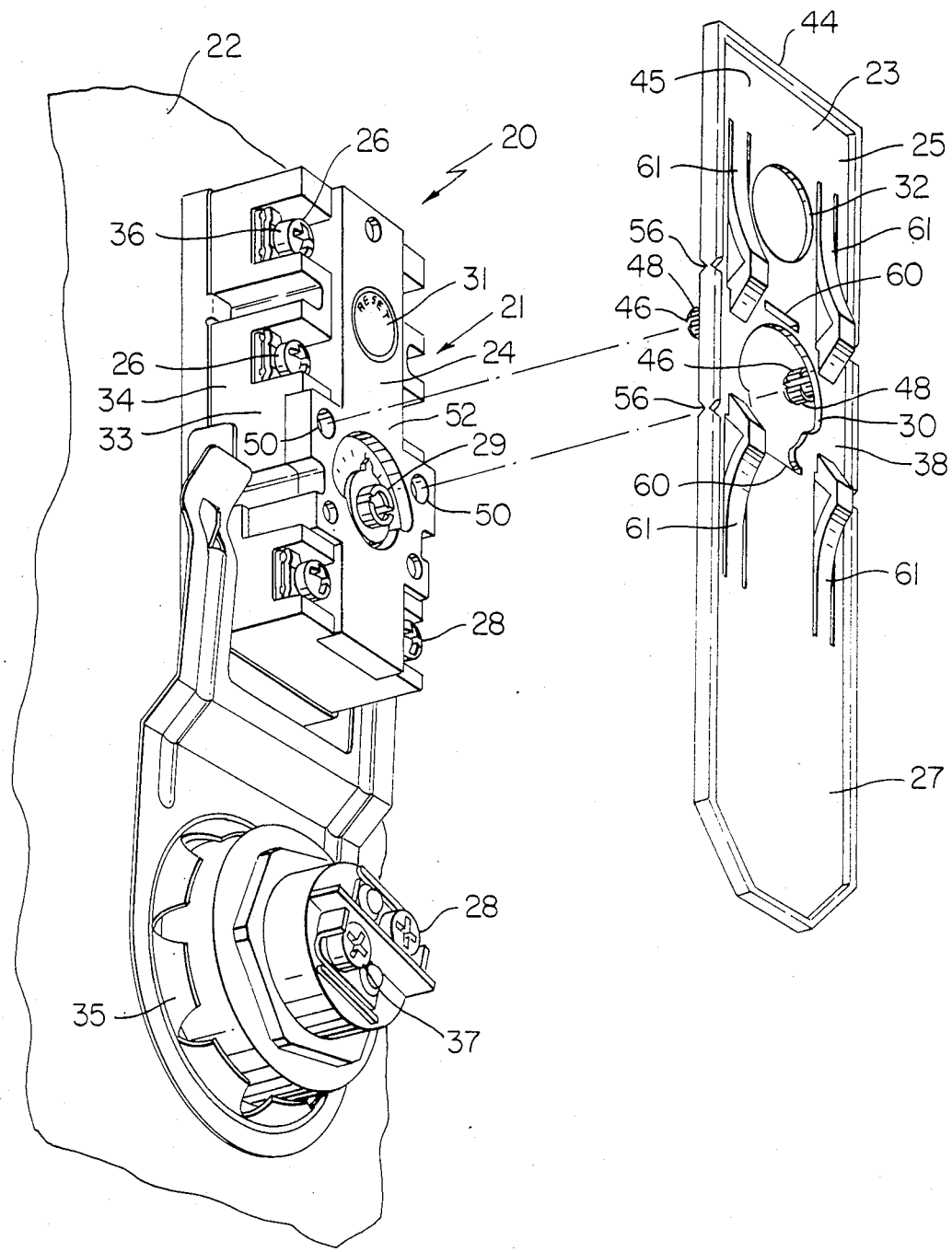
FIG. 1 is an exploded perspective view illustrating the new combination of this invention that comprises a control arrangement and a one-piece protective shield therefor.

While the various features of this invention are hereinafter illustrated and described as being particularly adapted to provide a protective shield for the control arrangement for a water heater, it is to be understood that the various features of this invention can be utilized singly or in various combinations thereof to provide a protective shield for control arrangements for other apparatus as desired.

Therefore, this invention is not to be limited to only the embodiment illustrated in the drawings, because the drawings are merely utilized to illustrate one of the wide variety of uses of this invention.

The new combination of applicant's invention is generally indicated by the reference numeral 20 in FIGS. 1 and 5 and comprises a control arrangement that is generally indicated by the reference numeral 21 for an electrically operated water heater tank 22 and a one-piece protective shield 23 that is carried by a housing means 24 of the control arrangement 21 and has a first section or end 25 for covering certain external electrical means 26 of the housing means 24 and another section or end 27 for covering other external electrical means 28 of the housing means 24 so as to tend to prevent contact with the external electrical means 26 and 28 when an operator is adjusting a temperature setting control knob 29 of the control arrangement 21 that is exposed at a first opening means 30 formed through the protective shield 23 or is operating a reset means 31 of the control arrangement 21 that is exposed at another opening means 32 formed through the protective shield 23.

Such general combination of a protective shield and a control arrangement and the reasons for the same are fully set forth in the aforementioned U.S. Pats., Nos. 3,621,197; 3,626,151; 3,914,660 and 3,914,661 whereby these four U.S. Pats. are being incorporated into this disclosure by this reference thereto.

While the control arrangement 21 can comprise any suitable structure, the same includes a first control device 33 having temperature operated electrical switch means (not shown) in a housing 34 thereof for controlling the electrical connection between an electrical power source (not shown) and an electrical heater means (not shown) that has an external portion of its housing means 35 forming part of the control arrangement 21 and being electrically interconnected to the control device 33 by suitable external leads (not shown), the control device 33 being likewise interconnected to the electrical power source by electrical leads (not shown). Such electrical leads in combination with the electrical terminals 36 and 37 of the housings 34 and 35 comprise the external electrical means 26 and 28 of the control arrangement 21 that are to be covered by the sections 25 and 27 of the protective shield 23 when the shield 23 is secured to the housing means 24 in a manner hereinafter set forth whereby the bared ends of such leads for connection to the terminals 36 and 37 as well as the terminals 36 and 37 will be covered by the sections 25 and 27 of the protective shield 23 when the sections 25 and 27 are disposed in their covering positions as will be apparent hereinafter.

The protective shield 23 of this invention comprises a one-piece structure formed of any suitable material, such as plastic material suitably molded into the configuration illustrated and hereinafter described. For example, one working embodiment of the protective shield 23 of this invention is formed by molding a polypropylene sold by Hercules Incorporated of Wilmington, Del. as "Hercules No. 6524 Red". Such protective shield 23 has a width of approximately 1.750 inches and an overall length of approximately 6.125 inches with the main body of the protective shield 23 being approximately 0.062 of an inch thick except at the peripheral edge thereof which is approximately 0.125 of an inch.

However, it is to be understood that the protective shield 23 of this invention can be formed of any suitable material and have any suitable dimensions as long as the same functions in the same manner as the protective shield of this invention as hereinafter described.

The protective shield 23 has an intermediate part 38 that has one end 39 hinged to one end 40 of the section 25 by integral hinge means that is generally indicated by the reference numeral 41. The other end 42 of the intermediate part 38 is hinged to an adjacent end 43 of the section 27 by similar integral hinge means that is also generally indicated by the reference numeral 41.

The outer peripheral edge of the protective shield 23 is defined by an upstanding flange 44 of the protective shield 23 and extends outwardly from a substantially flat front side 45 of the shield 23.

Two spaced apart projections 46 extend from the substantially flat rear side 47 of the protective shield 23 and are one-piece and integral with the intermediate part 38 thereof, each projection 46 having an enlarged bifurcated end 48 and a smaller substantially cylindrical intermediate part 49.

The housing means 24 of the control arrangement 21 has a pair of spaced apart stepped openings 50 formed therein with the smaller substantially cylindrical portions 51 of the openings 50 interrupting an outer flat side 52 of the housing 34 of the control device 33 and having larger cylindrical portions 53 respectively adapted to snap fittingly receive the enlarged ends 48 of the projections 46 when the same are inserted into the aligned openings 50 in the manner illustrated in FIG. 5 whereby the resulting shoulders 54 located between the enlarged ends 48 and intermediate parts 49 of the projections 46 will lock in abutting relation against the respective co-operating shoulders 55 defined by the junctures between the enlarged parts 53 and reduced parts 51 of the openings 50. In this manner, the protective shield 23 is adapted to be detachably secured to the housing means 24 of the control arrangement 21 so as to be in substantially a normally non-removable condition therewith.

Figure 6:
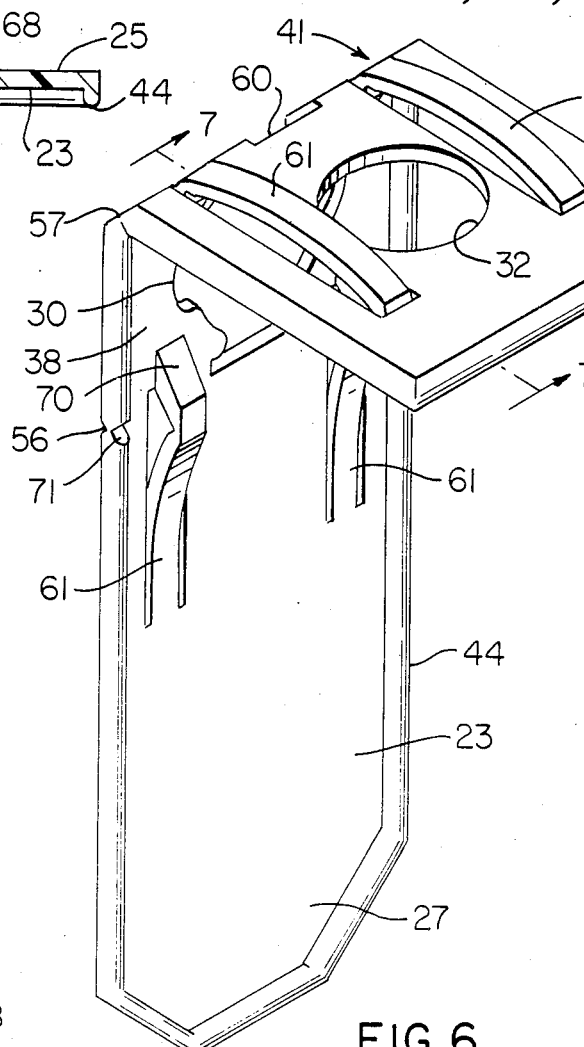
FIG. 6 is a perspective view of the protective shield of FIG. 1 with one of the sections thereof disposed in its uncovering position.
Figure 8:
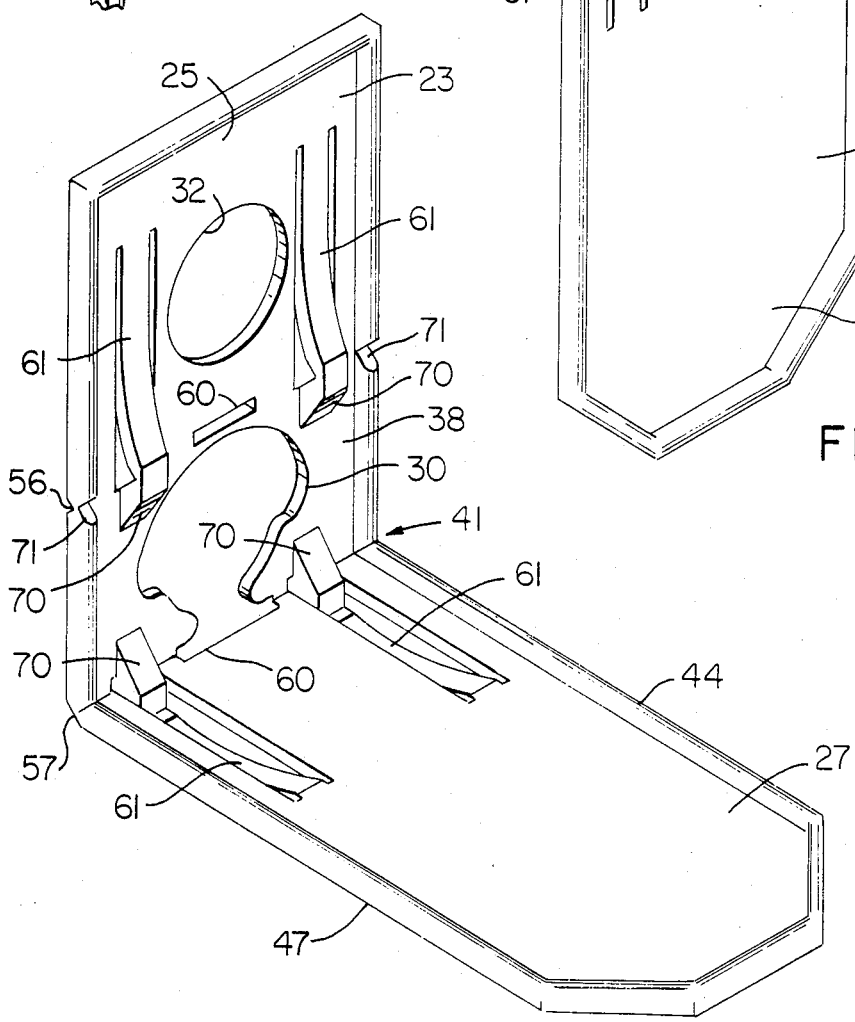
FIG. 8 is a view similar to FIG. 6 and illustrates another section of the protective shield of FIG. 1 in its uncovering position.

However, because the sections 25 and 27 of the protective shield 23 are respectively hinged to the intermediate part 38 of the protective shield 23, the same can be selectively moved out of their normal coplanar condition with the intermediate part 38 as illustrated in FIGS. 1, 2, 3, 4 and 5 to positions that are disposed substantially transverse thereto as illustrated respectively in FIGS. 6 and 8 so as to respectively be moved from their covering positions to their uncovering positions for providing access to the external electrical means 36 and 37 of the control arrangement 21 when desired. Thereafter, the sections 23 and 27 can be moved back from their uncovering condition as illustrated respectively in FIGS. 6 and 8 to their fully covering positions wherein the same are disposed substantially flat and coplanar with the intermediate part 38 so as to define a substantially flat covering structure for the control arrangement 21 in a manner not provided by the protective shields in the aforementioned four U.S. Pats. wherein the protective shields must be completely removed from their respective control arrangements in order to provide access to the external electrical means thereof.

Each hinge means 41 of the protective shield 25 includes a V-shaped recess 56 formed in the rear side 47 of the protective shield 23 and defining a substantially straight hinge line 57 extending from one side edge 58 of the protective shield 23 to the other side edge 59 thereof, the hinge line 57 being interrupted by a slot means 60 formed medially between the side edges 58 and 59. The slot 60 for the hinge means 41 between the intermediate part 38 and the section 27 is joined with the opening means 30 that passes through the intermediate part 38 as illustrated.

Each hinge means 41 includes a pair of spaced apart toggle members 61 each being molded so that the same has opposed free side edges 62 and 63 and opposed ends 64 and 65 respectively hinged by hinge lines 66 and 67 defined by recesses 68 and 69 respectively formed in the rear side 47 of the protective shield 23 and in post means 70 extending in an angular manner from the front side 45 of the intermediate part 38 of the protective shield 23.

Figure 7:
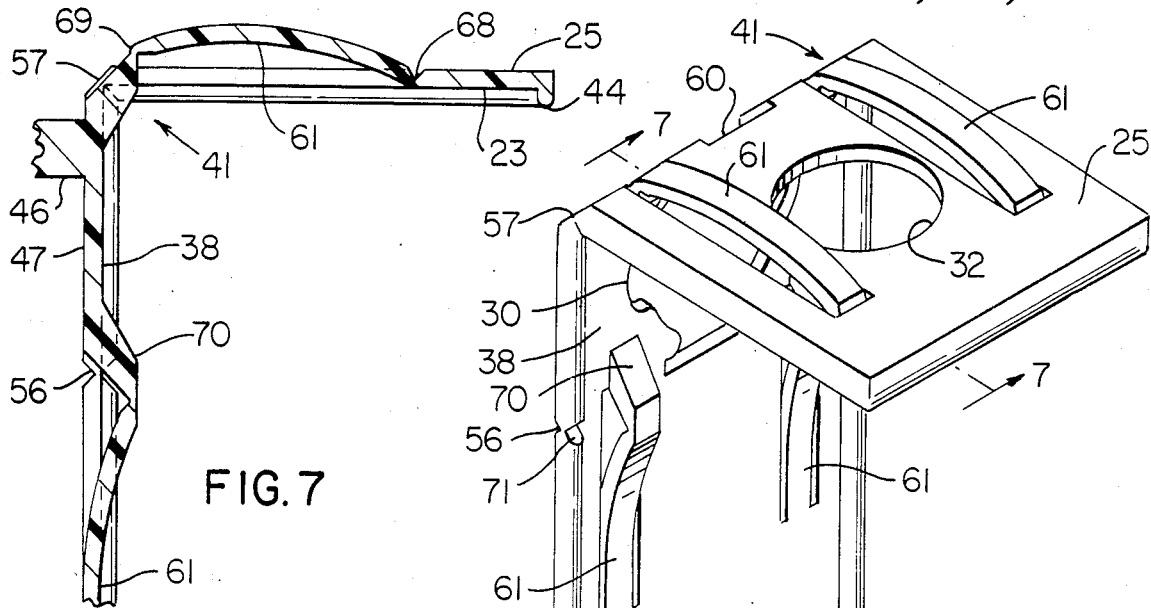
FIG. 7 is a fragmentary cross-sectional view taken on line 7—7 of FIG. 6.

The toggle members 61 function in a spring-like manner to hold the respective section 25 or 27 in either its covering position as illustrated in FIG. 5 or in its uncovering condition as illustrated in FIG. 7 by being bowed in the manner illustrated in FIG. 5 so that the same are over center on the front side 45 of the protective shield 23 or bowed so as to be over center on the rear side 47 of the protective shield 23 as illustrated in FIG. 7.

In this manner, the toggle members 61 act as spring means that tend to hold the sections 25 and 27 either in their full covering position as illustrated in FIG. 5 or in their full uncovering position as illustrated in FIGS. 6 and 8 while the hinge lines 57 of the hinge means 41 readily permit the sections 25 and 27 to be moved between their covering and uncovering positions in a manner well known in the plastic art as "living hinges".

In order to permit such movability of the sections 25 and 27, the annular flange 44 of the protective shield 23 is provided with V-shaped recesses 71 on the side 45 of the protective shield 23 in mirror image to the recesses 56 in the rear side 47 thereof.

Thus, it can be seen that the protective shield 23 of this invention can be formed in a relatively simple manner by the method of this invention by merely molding suitable plastic material into the one-piece configuration illustrated in the drawings whereby the resulting molded protective shield 23 can have the sections 25 and 27 thereof either held in their coplanar covering position as illustrated in FIG. 5 or held in their fully uncovering position as illustrated in FIGS. 6 and 8 by the integral toggle members 61 thereof.

After the protective shield 23 has been made in the above manner, the same is adapted to be utilized with the control arrangement 21 in a manner now to be described.

When the control arrangement 21 has been operatively interconnected to the water heater tank 22 as illustrated in FIG. 1 in a manner well known in the art, such as set forth in the aforementioned four U.S. Pats., the protective shield 23 of this invention can be secured thereto in the manner illustrated in FIG. 1 by inserting the projections 46 of the protective shield 23 into the openings 50 in the housing 34 of the control device 33 whereby the enlarged ends 48 thereof will be snap fitted into the enlargements 53 of the openings 50 to have the shoulders 54 thereof hook against the shoulders 55 of the housing means 34 and thereby secure the protective shield 23 to the housing means 24 of the control arrangement 21 with the rear side 57 of the intermediate part 38 of the protective shield 23 held against the flat surface 52 of the control device 33 whereby the sections 25 and 27 of the protective shield 23 when disposed in the coplanar position illustrated in FIGS. 1 and 5 will fully cover from the front of the control arrangement 21 the external electrical means 26 and 28 and will be held in such covering positions by the toggle members 61 as the same are disposed in their over center position on the front side of the front surface 45 of the protective shield 23.

However, should an operator desire to reach or otherwise have access to the certain external electrical means 26 of the control arrangement 21, that person merely grasps the section 25 of the protective shield 23 and folds the same outwardly to the position illustrated in FIGS. 6 and 7 whereby the section 25 folds on the hinge line 57 and the toggle members 61 snap over center from their forward positions illustrated in FIG. 5 to their rear positions illustrated in FIG. 7 wherein the same are disposed beyond the rear side 57 of the section 23 to hold the section 25 in its uncovering position as illustrated in FIGS. 6 and 7 which is substantially transverse to the intermediate part 38 of the shield 23.

After access has been made to such uncovered certain external electrical means 26, the operator then moves the section 25 from its uncovering position of FIGS. 6 and 7 back to its covering position as illustrated in FIG. 5 as the section 25 will unfold on its hinge line 57 back into its coplanar position with the intermediate part 38 and the toggle members 61 will snap back over center from their rear condition as illustrated in FIGS. 6 and 7 to their forward positions as illustrated in FIG. 5 so as to hold the unfolded section 25 in its coplanar and covering position as illustrated in FIG. 5 and thereby tend to prevent accidental access to the certain external electrical means 26.

Should it be desired to provide access to the other external electrical means 28 of the control arrangement 21, the other section 27 of the protective shield 23 can be moved from its covering position as illustrated in FIG. 5 to its uncovering position illustrated in FIG. 8 as the same will fold on the fold or hinge line 57 of its hinge means 41 and the toggle members 61 thereof will move or snap from their forward positions as illustrated in FIG. 5 in a manner to be over center beyond the rear side 47 of the section 27 to hold the section 27 in its uncovered position as illustrated in FIG. 8 wherein the same is substantially transverse to the intermediate part 38 of the shield 23. After such access has been made to the external electrical means 28, the operator then can move the section 27 of the shield 23 back to its covering and coplanar position as illustrated in FIG. 5 and the toggle members 61 will snap from their rear condition to their front condition as illustrated in FIG. 5 and thereby hold the section 27 in its covering condition until it is desired to again move the section 27 to its uncovering condition in the manner previously set forth.

Therefore, it can be seen that the one-piece shield 23 of this invention will always have its intermediate part 38 secured to the housing means 24 of the control arrangement 21 and the sections 25 and 27 can be selectively moved relative thereto between their covering and uncovering positions with the toggle members 61 holding the same in the desired covered or uncovered position thereof as the case may be.

While the hinge means 41 of this invention can be formed in any suitable configuration and dimensions to provide the aforementioned action, in the previously mentioned working embodiment of the protective shield 23 of this invention, it has been found that the toggle members 61 can each have a length of approximately 0.984 of an inch between their respective hinge lines 66 and 67 with a width of approximately 0.219 of an inch. The thickness of the hinge lines 66 and 67 for the toggle members 61 can be approximately 0.010 of an inch while the hinge lines 57 of the hinge means 41 can be approximately 0.020 of an inch.

Therefore, it can be seen that this invention not only provides a new protective shield and method of making the same, but also this invention provides a new combination of such a protective shield and a control arrangement and method of making the same.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement " and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a method of making a combination of a control arrangement having housing means provided with first and second external electrical means thereon and a one-piece protective shield carried by said housing means and having a first section thereof covering said first external electrical means, the improvement comprising the steps of forming said first section of said protective shield to be movable relative to the remainder of said shield between a first position thereof that covers said first external electrical means and a second position thereof that uncovers said first external electrical means, forming said protective shield to be substantially flat when said first section is in said first position thereof, forming said first section of said protective shield to be substantially transverse to said remainder of said shield when said first section is in said second position thereof, forming said protective shield to have hinge means that hinge said first section to said remainder of said shield between a first position thereof that tive shield to have a second section thereof covering said second external electrical means and be movable relative to the remainder of said shield between a first position thereof that covers said second external electrical means and a second position thereof that uncovers said second external electrical means.

2. A method as set forth to claim 1 and including the steps of forming said protective shield to be substantially flat when said sections are respectively disposed in said first position thereof and to have an intermediate part thereof separating said sections from each other, forming said intermediate part of said shield to have securing means that secures said shield to said housing means, forming said intermediate part to have opening means passing therethrough, and forming said housing means to have manually operable control means aligned with said opening means so as to be accessible at said opening means.

3. A method as set forth in claim 2 and including the steps of forming said housing means to have socket means, and forming said securing means of said shield that secures said shield to said housing means to comprise projection means received in said socket means.

4. A method as set forth in claim 1 and including the steps of forming said protective shield to comprise polypropylene, and forming said sections to comprise end sections of said shield.

5. In a method of making a protective shield for a control arrangement having housing means provided with first and second external electrical means thereon, said method comprising the step of forming said protective shield to be one-piece and be adapted to be carried by said housing means and have a first section thereof covering said first external electrical means, the improvement comprising the steps of forming said first section of said protective shield to be movable relative to the remainder of said shield between a first position thereof that is adapted to cover said first external electrical means and a second position thereof that is adapted to uncover said first external electrical means, forming said protective shield to be substantially flat when said first section is in said first position thereof, forming said first section of said protective shield to be substantially transverse to said remainder of said shield when said first section is in said second position thereof, forming said protective shield to have hinge means that hinge said first section to said remainder of said protective shield, and forming said protective shield to have a second section thereof adapted to cover said second external electrical means of said housing means and be movable relative to the remainder of said shield between a first position thereof that is adapted to cover said second external electrical means and a second position thereof that is adapted to uncover said second external electrical means.

6. A method as set forth in claim 5 and including the steps of forming said protective shield to be substantially flat when said sections are respectively disposed in said first positions thereof and to have an intermediate part thereof separating said sections from each other, forming said intermediate part of said shield to have securing means that is adapted to secure said shield to said housing means, and forming said intermediate part to have opening means passing therethrough adapted to be aligned with manually operable control means of said housing means.

7. A method as set forth in claim 6 and including the step of forming said securing means of said shield that is adapted to secure said shield to said housing means to comprise projection means that is adapted to be received in socket means of said housing means.

8. A method as set forth in claim 5 and including the steps of forming said protective shield to comprise polypropylene, and forming said sections to comprise end sections of said shield.

* * * * *